United States Patent
Glaza

(10) Patent No.: US 7,499,798 B2
(45) Date of Patent: Mar. 3, 2009

(54) METHOD FOR TRANSFERRING ROUTES BETWEEN NAVIGATIONAL DEVICES

(75) Inventor: Mark J. Glaza, Warren, MI (US)

(73) Assignee: General Motors Corporation, Detroit, MI (US)

( * ) Notice: Subject to any disclaimer, the term of this patent is extended or adjusted under 35 U.S.C. 154(b) by 698 days.

(21) Appl. No.: 11/063,481

(22) Filed: Feb. 23, 2005

(65) Prior Publication Data

US 2006/0190164 A1    Aug. 24, 2006

(51) Int. Cl.
| | |
|---|---|
| G01C 21/26 | (2006.01) |
| G01C 21/28 | (2006.01) |
| G01C 21/34 | (2006.01) |
| G01C 21/36 | (2006.01) |
| G08G 1/123 | (2006.01) |
| G08G 1/127 | (2006.01) |
| G08G 1/13 | (2006.01) |
| G08G 1/133 | (2006.01) |
| G08G 1/137 | (2006.01) |
| G08G 1/09 | (2006.01) |
| G08G 1/096 | (2006.01) |
| G08G 1/0962 | (2006.01) |
| G08G 1/0968 | (2006.01) |
| G08G 1/0969 | (2006.01) |

(52) U.S. Cl. .............. 701/202; 701/200; 701/209; 701/208; 340/995.19; 340/995.12

(58) Field of Classification Search .............. 701/202, 701/200, 209; 340/995.19, 995.12
See application file for complete search history.

(56) References Cited

U.S. PATENT DOCUMENTS

| | | | |
|---|---|---|---|
| 5,450,344 A * | 9/1995 | Woo et al. | 701/213 |
| 6,252,544 B1 | 6/2001 | Hoffberg | |
| 6,643,587 B2 | 11/2003 | Brodie | |
| 6,741,931 B1 * | 5/2004 | Kohut et al. | 701/209 |
| 6,925,378 B2 | 8/2005 | Tzamaloukas | |
| 2003/0236818 A1 * | 12/2003 | Bruner et al. | 709/200 |
| 2004/0142678 A1 | 7/2004 | Krasner | |
| 2005/0215200 A1 | 9/2005 | Oesterling | |

OTHER PUBLICATIONS

U.S. Appl. No. 10/909,500, filed Aug. 2, 2004, Hitan Kamdar.

* cited by examiner

*Primary Examiner*—Khoi Tran
*Assistant Examiner*—Nikhil Sriraman

(57) ABSTRACT

A method for navigation includes providing a route, including at least first and second route portions, at a telematics unit and determining a route status. The method further sends the second route portion to a mobile communication device based on the route status.

17 Claims, 3 Drawing Sheets

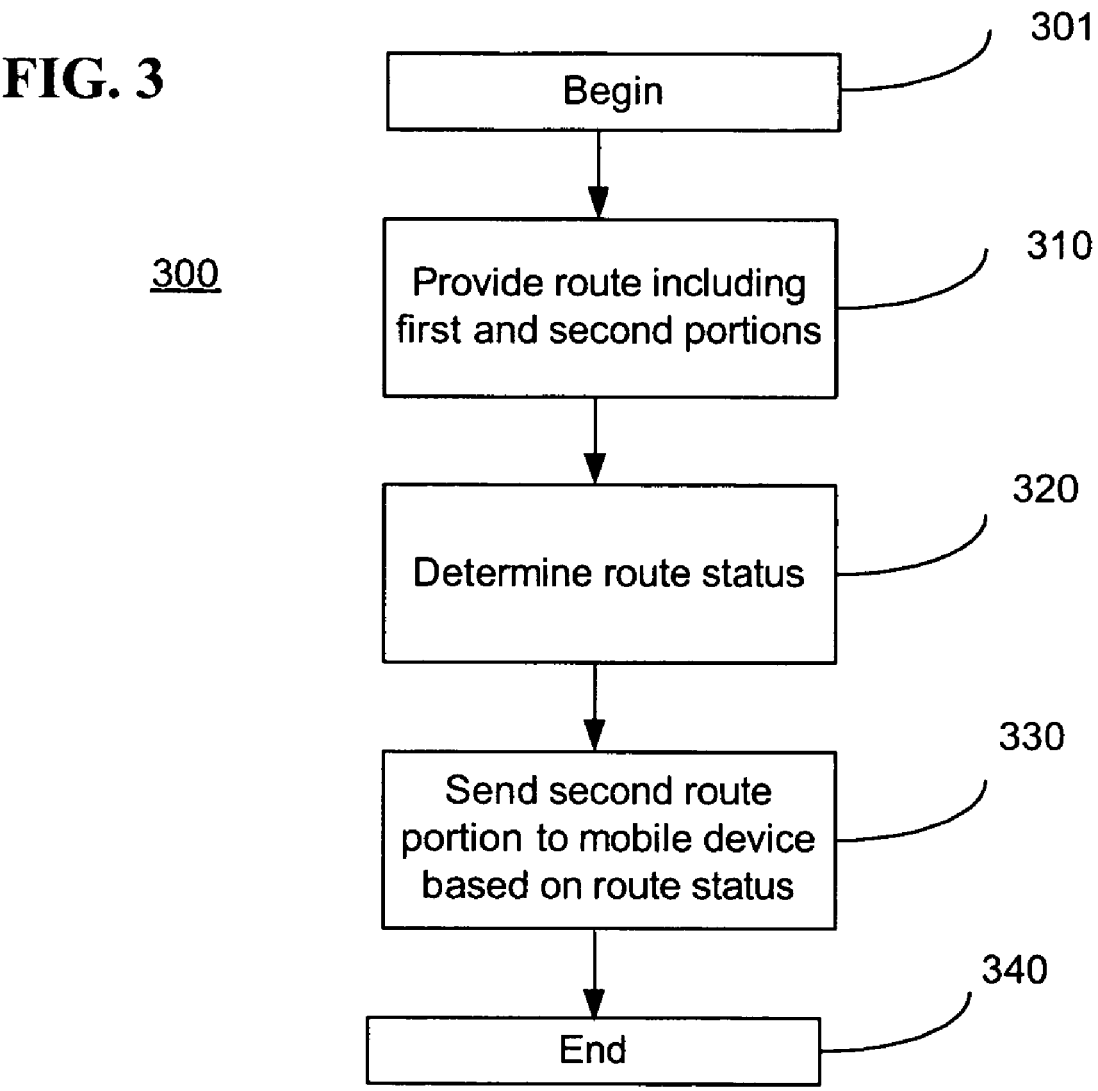

METHOD FOR TRANSFERRING ROUTES BETWEEN NAVIGATIONAL DEVICES

FIELD OF THE INVENTION

The present invention generally relates to navigation using multiple navigation devices.

BACKGROUND OF THE INVENTION

Use of navigational devices has increased in recent years. Automobile-based navigational systems are convenient while driving, while hand-held navigational devices are often more convenient when not in a mobile vehicle.

For example, a hiker may desire directions to a particular campground using common roadways, yet an additional route to a particular spot that is not easily accessible to a motor vehicle. Similarly, a shopper may desire directions to a mall, and then directions to a particular store within the mall.

The present invention overcomes these disadvantages and advances the state of the art in navigation systems.

SUMMARY OF THE INVENTION

One aspect of the present invention provides a method for navigation including providing a route, including at least first and second route portions, at a telematics unit and determining a route status. The method further includes sending the second route portion to a mobile communication device based on the route status.

Another aspect of the invention provides a computer readable medium including computer readable code for providing navigation. The medium includes computer readable code for providing a route, including at least first and second route portions, at a telematics unit and computer readable code for determining a route status. The medium further includes computer readable code for sending the second route portion to a mobile communication device based on the route status.

Another aspect of the invention provides a system for navigation. The system includes means for providing a route, including at least first and second route portions, at a telematics unit and means for determining a route status. The system further includes means for sending the second route portion to a mobile communication device based on the route status.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

FIG. 3 illustrates a process flow diagram of a method for navigation in accordance with the present invention.

DETAILED DESCRIPTION OF THE PREFERRED EMBODIMENTS

Figure 1:
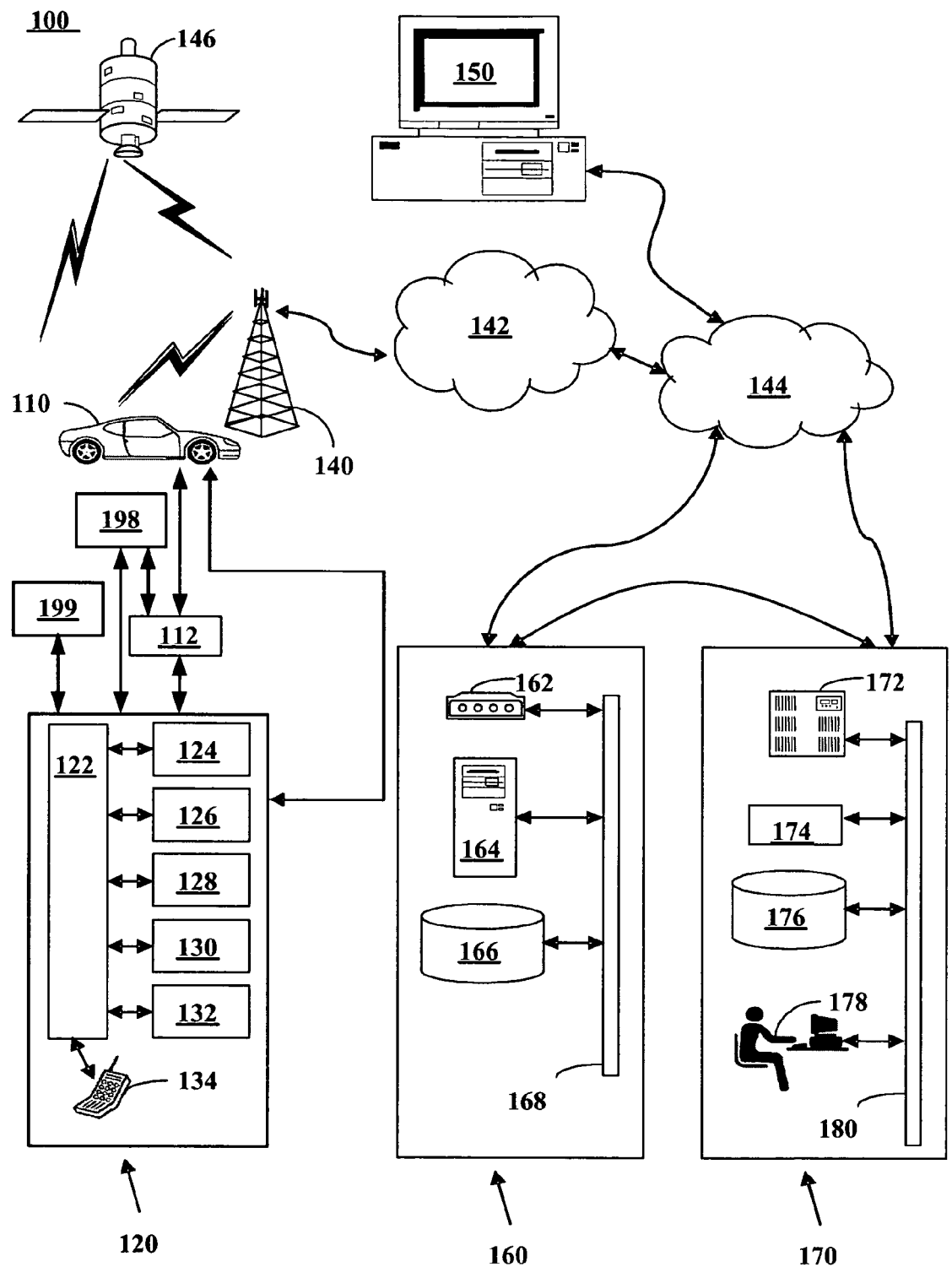
FIG. 1 illustrates an operating environment for a navigational system having multiple devices.

FIG. 1 illustrates an operating environment for a mobile vehicle communication system ("MVCS") 100 for navigation. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112 sends signals to various units of equipment and systems (detailed below) within MVCU 110 to perform various functions such as unlocking a door, opening the trunk, setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization ("ISO") Standard 9141, ISO Standard 11898 for high speed applications, ISO Standard 11519 for lower speed applications, and Society of Automotive Engineers Standard J1850 for high speed and lower speed applications.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170.

Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized setting supplied by the client, such as door lock/unlock behavior, radio station preset selections, climate controls, custom button configurations, and theft alarm settings. For each client, the web server 164 server potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one of more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

External navigation unit 198 is configured to autonomously generate and display route instructions. In one embodiment, external navigation unit 198 is configured to accept and display route instructions from the telematics unit 120. In another embodiment, the external navigation unit is configured to accept and display route instructions from the call center 170. In yet another embodiment, external navigation unit 198 is configured to accept a route from a user using any appropriate input device, such as removable media, keyboard, or wireless network interface, and display the route using a visual or audible output device. In one embodiment, external navigation unit communicates with the telematics unit 120 via the vehicle network 112. In another embodiment, the external navigation unit communicates with the telematics unit 120 directly via a hard wired interface. In one embodiment, processor 122 controls the external navigation unit 198. In another embodiment, an internal processor controls the external navigation unit 198. In one embodiment, external navigation unit 198 is resident within the MVCU 110. Navigation instructions may flow from the call center through the external navigation unit and then flow into mobile communication device 199.

Mobile communication device 199 is configured to display navigation information. As used herein, displaying navigation information includes a visual display as well as an audible instruction. Mobile communication device 199 is configured for communication with telematics unit 120. For example, in one embodiment, mobile communication device 199 includes a display screen. In another embodiment, mobile communication device 199 includes a GPS receiver for identifying a current location. Mobile communication device 199 includes a wireless transceiver for transferring information to and from mobile communication device 199. In one embodiment, mobile communication device 199 includes a transceiver compliant with FCC Part 15 protocols, such as 802.11, or Bluetooth. In another embodiment, mobile communication device 199 is configured to connect to the Internet, and includes; for example, email applications, File Transfer Protocol ("FTP") applications, web browsing applications or any other appropriate information transfer tools. In one embodiment, mobile communication device 199 is a cellular telephone, while in other embodiments, mobile communication device 199 is a pocket PC, portable computer (i.e., laptop), or other similar device. In another embodiment, mobile communication device 199 is another telematics unit in a different vehicle. In another embodiment, mobile communication device 199 executes an application that provides turn-by-turn navigation.

Figure 2:
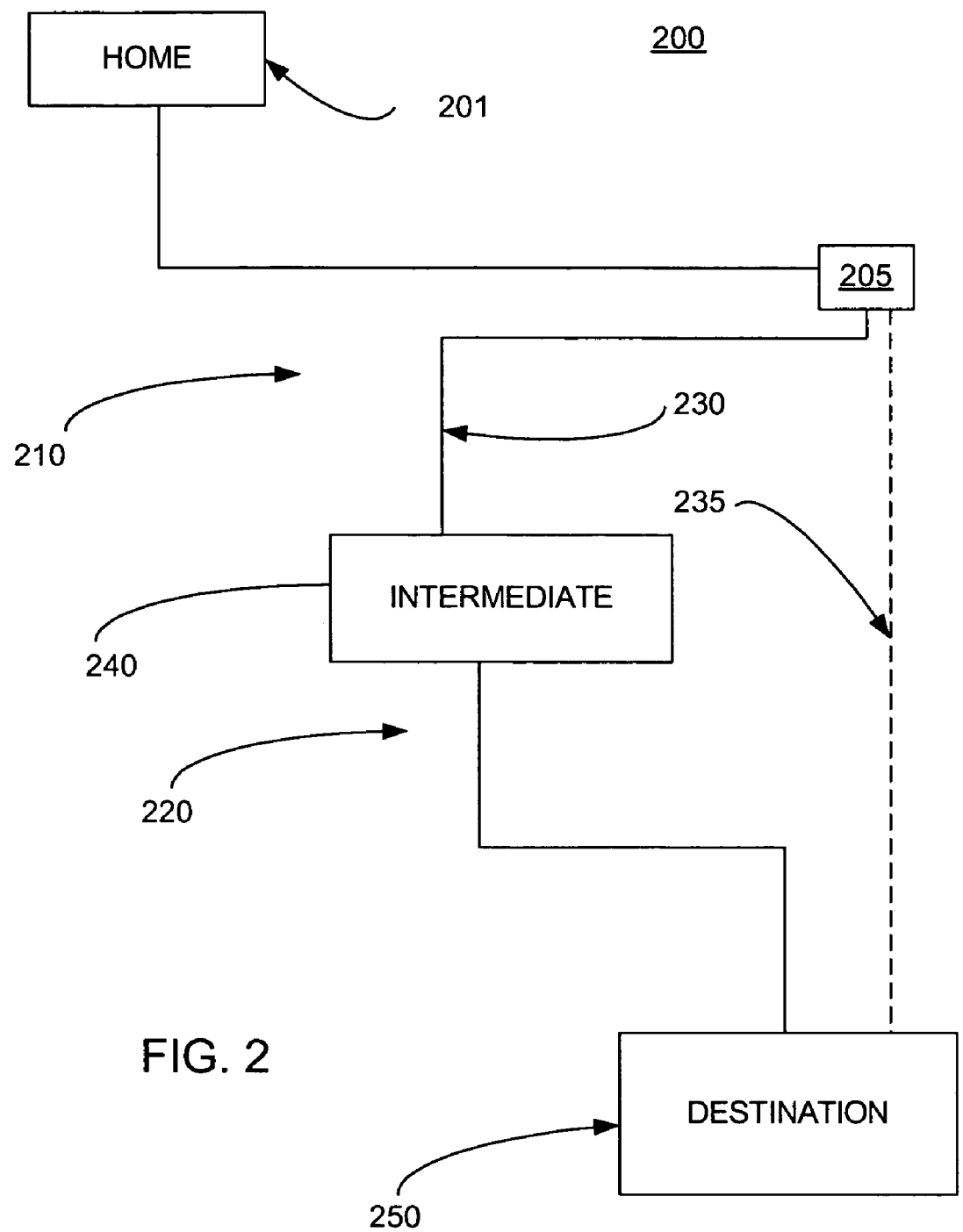
FIG. 2 illustrates a route used in navigation in accordance with the present invention.

FIG. 2 illustrates one embodiment of a route 200 in accordance with one aspect of the invention. Route 200 includes first portion 210 and second portion 220. Intermediate point 240 lies at the intersection of first portion 210 and second portion 220. Waypoint 205 lies at a point along first portion 210 between HOME 201 and intermediate point 240. A waypoint time is the estimated travel time for travel between waypoint 205 and intermediate point 240. A waypoint distance is the estimated distance between waypoint 205 and intermediate point 240. A destination distance 235 is the estimated distance between waypoint 205 and destination 250. In accordance with the invention, both the waypoint distance and destination distance may be calculated either by straight line, or Great Circle Navigation, colloquially known as "as the crow flies," or by estimating the distance to be actually traveled, or "route distance." In other embodiments, distances are calculated using polygonal, elliptical, or oval calculations, as known in the art.

FIG. 3 illustrates one embodiment of a method 300 for navigation in accordance with the instant invention. Method 300 begins at 301.

A route is provided at a telematics unit at 310. The route includes at least a first and second portion. In one embodiment, the route is provided by a call center in wireless communication with the telematics unit. In various embodiments, a user or an advisor establishes the route. In other embodiments, the route is provided to the telematics unit by a user over a wireless communication link between the user and the telematics unit. For example, a user may operate a laptop to provide the telematics unit with the route using an 802.11 connection. A user may establish a route using computer 150 or by communication with an advisor. In yet another embodiment, the route is manually entered into the telematics unit using a direct instruction, such as by a keyboard in communication with the telematics unit. In another embodiment, the route is generated by the mobile communication device, such as mobile communication device 199.

Method 300 determines a route status at 320. In one embodiment, a route status is determined by comparing a current GPS location with a GPS location for the intermediate or destination locations. In one embodiment, determining a route status comprises estimating a waypoint time. In another embodiment, determining a route status comprises estimating a waypoint distance. In another embodiment, determining a route status comprises estimating a destination distance. The method of determining a route status may be user controlled, or may be a pre-set method, or may be dynamically controlled by a third party, such as call center 170.

Having determined a route status, method 300 sends the second route portion to a mobile communication device, such as mobile communication device 199, based on the route status at 330. In one embodiment, the second route portion is sent to the mobile communication device via a wireless connection.

The manner in which the route status is determined controls when the second portion of the route is sent to the mobile communication device. In embodiments wherein route status is determined by estimating a waypoint time, the timing is determined by an estimated time to transfer the route. For example, the telematics unit estimates that transfer of a particular route will take 30 seconds. In such an example, the telematics unit will initiate transfer at least 30 seconds prior to arrival at the intermediate location. Thus, when determining route status, the telematics unit compares the estimated transfer time with the waypoint time, and initiates transfer when the estimated transfer time is substantially equal to the waypoint time.

In another embodiment, route status is determined by an estimation of a waypoint distance. A waypoint distance is compared to a transfer distance to determine when to initiate transfer of the second portion. A transfer distance is a distance from the waypoint at which to initiate transfer, and transfer distance may be user configured, pre-set, or dynamically controlled by the call center. The telematics unit initiates transfer of the second portion when the waypoint distance is substantially equal to the transfer distance. Similarly, in embodiments wherein route status is determined by a destination distance, the telematics unit initiates transfer of the second portion when the destination distance is substantially less than equal to the transfer distance. Method 300 ends at step 340.

In other embodiments, the telematics unit also sends a third portion of a route to the mobile communications unit. For example, the third portion of a route may provide navigation directions to return to the users vehicle. In another example, the third portion of a route includes directions from a campsite to a waterfall.

The present invention may be embodied in other specific forms without departing from the spirit or essential characteristics. The described embodiments are to be considered in all respects only as illustrative and not restrictive.

What is claimed is:

1. A method for providing navigation information from a mobile telematics unit to a mobile communication device associated with the telematics unit, the method comprising:
    providing a route, including at least first and second route portions, at the telematics unit;
    providing the first route portion from the telematics unit to the mobile communication device;
    at the telematics unit determining a route status indicative of a position of the mobile communication device along the first route portion; and
    sending the second route portion to the mobile communication device if the route status indicates progress of a predetermined extent of the mobile communication device along the first route portion.

2. The method of claim 1, wherein the determining a route status comprises estimating a waypoint time, wherein the waypoint time is the time until arrival of the mobile communication device at an intermediate location.

3. The method of claim 2, wherein the sending of the second route portion comprises sending the second route portion to the mobile communication device when the waypoint time is substantially equal to a second route portion transfer time.

4. The method of claim 1, wherein determining a route status comprises estimating a waypoint distance.

5. The method of claim 4, wherein the waypoint distance is the distance until arrival of the mobile communication device at an intermediate location.

6. The method of claim 1, wherein the determining a route status comprises estimating a destination distance.

7. The method of claim 6 wherein the destination distance is a distance to the end of the second route portion.

8. The method of claim 1 wherein sending the second route portion to the mobile communication device based on the route status comprises sending the second route portion from the telematics unit to the mobile communication device via a wireless connection.

9. A computer usable medium having thereon computer readable instructions for providing navigation instructions from a mobile telematics unit to a mobile communication device associated with the telematics unit, the computer readable instructions comprising:

computer readable instructions for providing a route, including at least first and second route portions, at a telematics unit;

computer readable instructions for providing the first route portion from the telematics unit to the mobile communication device;

computer readable instructions for determining a route status indicative of a position of the mobile communication device along the first route portion; and computer readable instructions for sending the second route portion to a mobile communication device device if the route status indicates progress of a predetermined extent of the mobile communication device along the first route portion.

10. The computer usable medium of claim 9, wherein computer readable instructions for determining a route status comprises computer readable instructions for estimating a waypoint time, wherein the waypoint time is the time until arrival of the mobile communication device at an intermediate location.

11. The computer usable medium of claim 10, wherein the computer readable instructions for sending of the second route portion comprises computer readable instructions for sending the second route portion to the mobile communication device when the waypoint time is substantially equal to a second route portion transfer time.

12. The computer usable medium of claim 9, wherein computer readable instructions for determining a route status comprises computer readable code for estimating a waypoint distance.

13. The computer usable medium of claim 12, wherein the waypoint distance is the distance until arrival at an intermediate location.

14. The computer usable medium of claim 9, wherein computer readable instructions for determining a route status comprises computer readable instructions for estimating a destination distance.

15. The computer usable medium of claim 14 wherein the destination distance is a distance to the end of the second route portion.

16. The computer usable medium of claim 9, wherein computer readable instructions for sending the second route portion to the mobile communication device based on the route status comprises computer readable instructions for sending the second route portion via a wireless connection.

17. A system for providing navigation information from a mobile telematics unit to a mobile communication device associated with the telematics unit, the system comprising:

means for providing a route, including at least first and second route portions, at the telematics unit;

means for providing the first route portion from the telematics unit to the mobile communication device;

means for determining at the telematics unit a route status indicative of a position of the mobile communication device along the first route portion; and means for sending the second route portion to the mobile communication device if the route status indicates progress of a predetermined extent of the mobile communication device along the first route portion.

* * * * *